United States Patent [19]

Kikuchi

[11] 4,381,051
[45] Apr. 26, 1983

[54] TEMPERATURE-SENSITIVE FLUID COUPLER

[75] Inventor: Yasubee Kikuchi, Shizuoka, Japan

[73] Assignee: Usui Kokusai Sangyo Kabushiki Kaisha, Shizuoka, Japan

[21] Appl. No.: 238,677

[22] Filed: Feb. 27, 1981

[30] Foreign Application Priority Data

Mar. 11, 1980 [JP] Japan ............................ 55-30674

[51] Int. Cl.³ ....................... F16D 43/25; F16D 35/00
[52] U.S. Cl. ................................. 192/82 T; 192/48.7; 192/58 B
[58] Field of Search .................. 192/48.7, 58 B, 82 T

[56] References Cited

U.S. PATENT DOCUMENTS 4,060,158 11/1977 Kikuchi .......................... 192/82 T
4,062,432 12/1977 Evans ....................... 192/82 T XR

FOREIGN PATENT DOCUMENTS 1957587 6/1970 Fed. Rep. of Germany .... 192/58 B

Primary Examiner—Allan D. Herrmann
Attorney, Agent, or Firm—Hedman, Casella, Gibson, Costigan & Hoare

[57] ABSTRACT

A fluid is filled in a space between a cover and an outer casing, to which a plurality of vanes are attached, and there is disposed in the aforementioned space a partition which is formed with two fluid inlet ports. An inner casing is sandwiched between the partition and the outer casing thereby to form a reservoir between the cover and the partition, an inner torque transmitting chamber between the partition and the inner casing, and an outer torque transmitting chamber between the inner casing and the outer casing. One of the fluid inlet ports of the partition is made to have communication with the inner torque transmitting chamber, whereas the other fluid inlet port is made to have communication with the outer torque transmitting chamber. The two fluid inlet ports are opened and closed by means of two valves, respectively, which are preset at different temperatures. The temperature-sensitive fluid coupler thus constructed can suppress noise while still reducing the power consumption.

11 Claims, 11 Drawing Figures

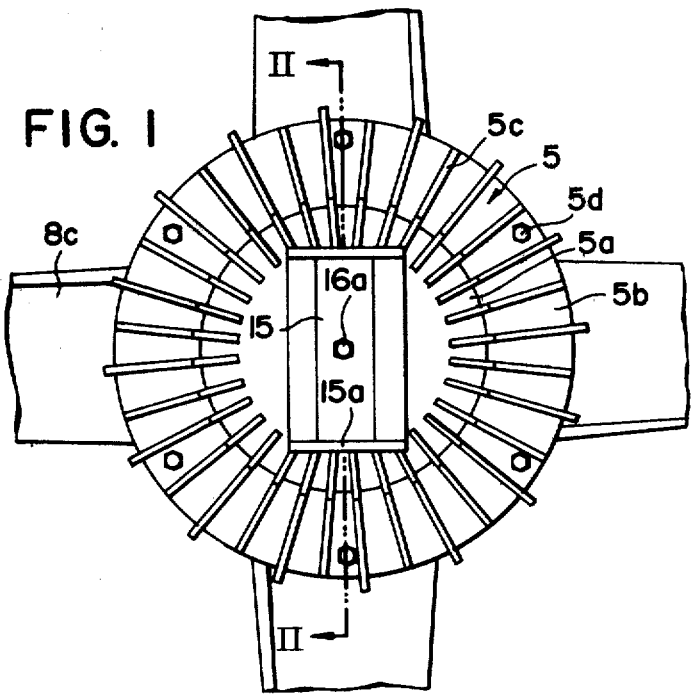
FIG. 1
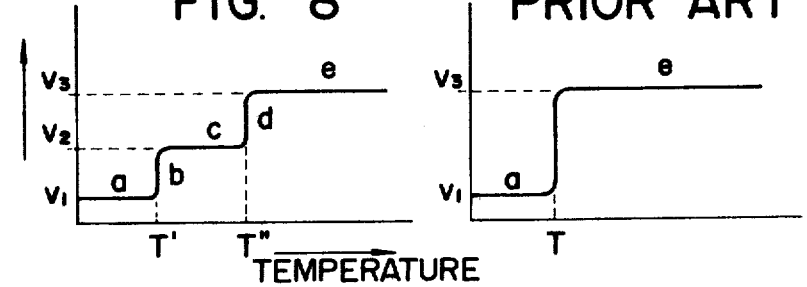
FIG. 8
FIG. 10 PRIOR ART
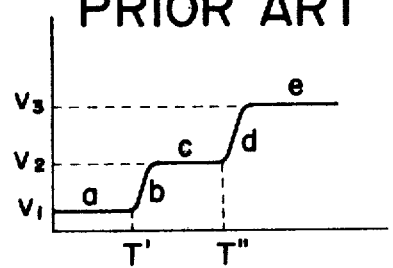
FIG. 9 PRIOR ART
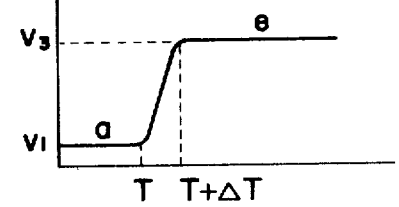
FIG. 11 PRIOR ART

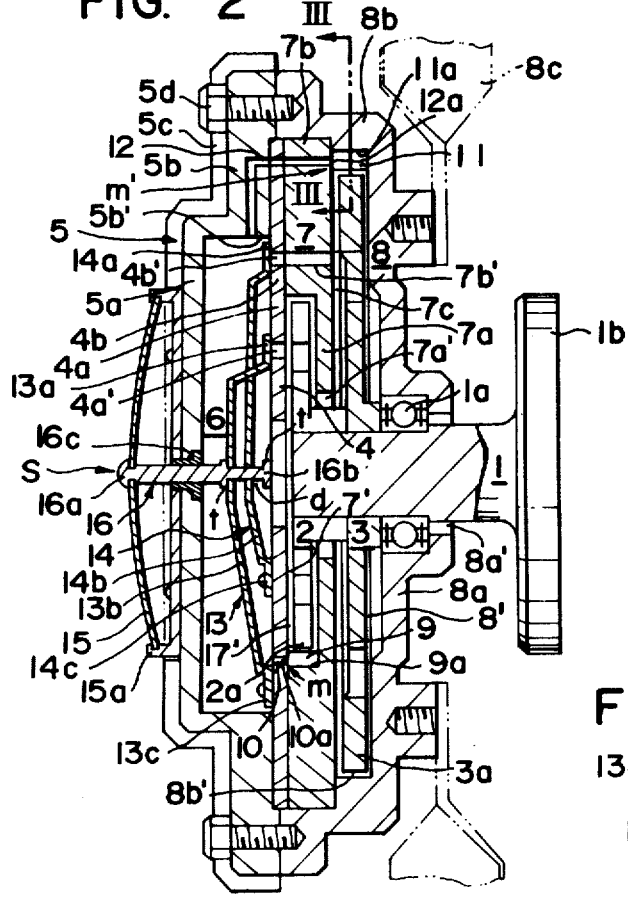

TEMPERATURE-SENSITIVE FLUID COUPLER

The present invention relates to a fluid coupler, and more particularly to a temperature-sensitive fluid coupler by means of which the speed of a fan driven through the coupler may be increased and decreased in accordance with the changes in the ambient temperature.

Intrinsically, a fluid coupler is used partly to eliminate waste of power and thereby conserve fuel and partly to suppress noise. In the case of a fluid coupler used to drive the cooling fan of an engine, the flow of the fluid is determined by means of a temperature-sensitive extendible element such as a bimetal component so that a fluid inlet port between a reservoir and a transmitting chamber is opened and closed at predetermined temperatures thereby to increase and decrease the fluid coupling. When, in this case, the flow of fluid is gradually increased or decreased in the transmitting chamber, it is impossible to avoid the generation of noise at the instant of increase or decrease. The range, within which the abnormal noises are generated, can be illustrated with reference to FIG. 11 of the accompanying drawings in which the speed of a fan driven through a fluid coupler is plotted against temperature. The abnormal noise range extends from an ambient temperature T to an ambient temperature T+$\Delta$T, and the range over which no abnormal sound is generated extends over a temperature range lower than the temperature T and a temperature range higher than the temperature T+$\Delta$T. The coupler having the characteristics illustrated in the graph shown in FIG. 11 is a conventional one of the type in which only one torque transmitting chamber is provided at one side of a partition. In an automobile in which the cooling fan is driven through such a coupler abnormal sounds are generated all through the change between V, and V$_3$ and this causes the driver and any passengers in the automobile considerable discomfort.

The inventor of the present invention has already proposed a fluid coupler, which has characteristics illustrated in the graph shown in FIG. 9, in Japanese Patent Publication No. 55-616 published on Jan. 9, 1980 and now shown in FIG. 9 of the accompanying drawings. With the use of the coupler proposed there are still left the inclined ranges, within which noises are generated, along slopes b and d. In FIG. 9 the speed of a fan driven through such a fluid coupler is plotted against temperature, letters T' and T" denoting a predetermined lower temperature and a predetermined higher temperature respectively. Further, a fluid coupler having the characteristics shown in FIG. 10 has also been proposed, but the power cannot be spared at a revolving speed between flat lines a and e.

It is therefore an object of the present invention to provide a temperature-sensitive fluid coupler which further shortens the aforementioned range in which noise is generated, so that noise can be suppressed while still reducing power consumption.

According to a feature of the present invention, two torque transmitting chambers are provided at one side of a partition, which is formed with holes for feeding the respective transmission chambers with a fluid, and the aforementioned holes are opened and closed by means of valves which are preset at different temperatures.

In particular, a temperature-sensitive fluid coupler comprises a reservoir defined by one side of a partition and a cover; a first torque transmitting chamber defined by the other side of the partition and an inner casing; a second torque transmitting chamber defined by the inner casing and an outer casing; first and second rotors fixed to a drive shaft and rotatable within the first and second torque transmitting chambers, respectively; first and second fluid inlet ports formed in the partition for providing communication between the reservoir and the first torque transmitting chamber and between the reservoir and the second torque transmitting chamber, respectively; at least one temperature-sensitive element mounted on the outer side of the cover; a valve for each of the inlet ports; and means connecting the two valves to the temperature-sensitive element for consecutively opening and closing the valves in response to changes in temperature.

IN THE ACCOMPANYING DRAWINGS

FIG. 1 is a front elevation showing one embodiment of a fluid coupler according to the present invention;

FIG. 2 is a section taken along line II—II of FIG. 1;

FIG. 3 is a section taken along line III—III of FIG. 2;

Figure 6:
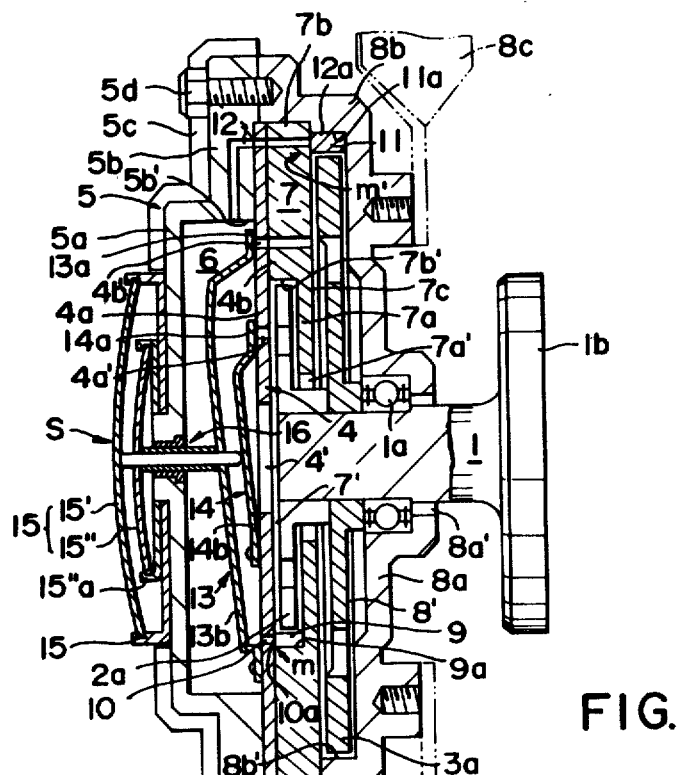
Figure 7:
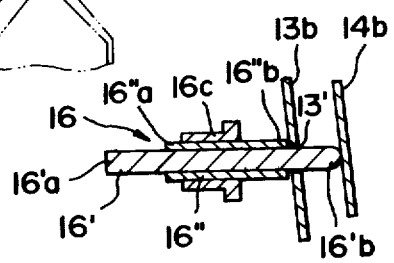

FIGS. 4 and 5 are partially enlarged lefthand side elevations items 13 and 14 of FIG. 2;

FIG. 6 is similar to FIG. 2 but shows another embodiment of the present invention;

FIG. 7 is an enlarged view of item 16 of FIG. 6;

FIG. 8 is a graph illustrating the characteristics of the fluid coupler according to the present invention; and FIGS. 9 to 11 are graphs illustrating the characteristics of conventional fluid couplers.

In FIGS. 1 to 7, a drive shaft 1 is supported by a bearing 1a and is provided with a joint flange 1b. An inner rotor 2 and an outer rotor 3 respectively are rotatable with the drive shaft 1 while being immovable in the axial direction and are formed with circumferential edges 2a and 3a respectively. A cover 5 is composed of an end wall 5a and a ring-shaped circumferential wall 5b having an inner circumference 5b' and is provided with a number of fins 5c mounted by means of a plurality of bolts 5d. The cover 5 thus constructed is disposed at one side of the partition 4 to define therewith together a reservoir 6. A casing 7 is composed of an end wall 7a and an outer circumferential wall 7b. The end wall 7a is formed with both a centre hole 7a', through which the drive shaft 1 extends for free rotation, and a back end face 7c. An outer casing 8 together with the inner casing 7, is so located on the other side of partition 4 that its inner recess is disposed at a spacing from the back end face 7c and in alignment with the inner casing 7. Attached to outer casing 8 are a plurality of vanes 8c. The partition 4 is composed of an inner portion 4a which is surrounded by the outer circumferential wall 7b of of the inner casing 7, and an outer portion 4b which is surrounded by the outer circumferential wall 5b of the cover 5. In the embodiment shown, the outer partition portion 4b is fitted on the outer circumferential wall 7b on the inner casing 7 from the outer circumference of the inner partition portion 4a. However, this inner partition portion 4a, is spaced from the inner end face of the inner casing 7 thereby to form an inner chamber 7' (the same reference numeral as that of a later-described inner transmitting chamber). Moreover, the inner casing 7 has its back end face 7c spaced from the inner end face of the outer casing 8 thereby to form an outer chamber 8' (the same reference numeral as that of a later-described outer transmitting chamber). The bearing 1a is axially fixed in the centre hole 8a' of the end all 8a of the outer casing 8, while engaging with the drive shaft 1, so that the respective end walls 7a and 8a of the two casings 7 and 8 are allowed to freely rotate in alignment on the drive shaft 1 but not move in the axial direction. Thus, the inner casing 7 forms the inner transmitting chamber 7' receiving the aforementioned inner rotor 2 for free rotation, whereas the outer casing 8 forms the outer transmitting chamber 8' receiving the aforementioned outer rotor 3 for free rotation. An inner inlet port 4a' is formed in the inner partition portion 4a for providing communication from the reservoir 6 to the inner transmitting chamber 7'. An outer inlet port 4b' is formed in the outer partition portion 4b for providing communication from the reservoir 6 to the outer transmitting chamber 8'. An inner fluid feeder m is provided for feeding, when in driving operation, the reservoir 6 with a fluid under pressure from the inner transmitting chamber 7'. The inner fluid feeder m is composed of the circumferential edge 2a of the inner rotor 2, an inner dam 9, which extends between that circumferential edge 2a and the inner circumferential wall 7b' of the inner transmitting chamber 7', and the inlet port 10a of an inner fluid port 10 for feeding fluid under pressure from the inner transmitting chamber 7' into the reservoir 6. Inlet port 10a opens into the inner transmitting chamber 7' so that fluid, which is about to be pumped to flow through the inlet port 10a, when in driving operation, by the actions of the rotors 2 and 3, impinges upon the inner dam 9. As a result, fluid is collected under pressure at the impinging side of the inner dam 9 and is pumped under pressure into the aforementioned inlet port 10a and into the reservoir 6 through the inner fluid port 10.

Also provided is an outer fluid feeder m' for feeding, when in driving operation, the reservoir 6 with fluid under pressure out of the outer transmitting chamber 8'. The outer fluid feeder m' is composed of the circumferential edge 3a of the outer rotor 3, an outer dam 11, which extends between that circumferential edge 3a and the inner circumferential wall 8b' of the outer transmitting chamber 8', and the inlet port 12a of an outer fluid port 12 for feeding fluid under pressure from the outer transmitting chamber 8' into the reservoir 6. That inlet port 12a opens into the outer transmitting chamber 8' so that fluid, which is about to be pumped to flow through the inlet port 12a, when in driving operation, by the actions of the rotors 2 and 3, impinges upon the outer dam 11. As a result, fluid is collected under pressure at the impinging side of the outer dam 11 and is pumped under pressure into the aforementioned inlet port 12a and into the reservoir 6 through the outer fluid port 12. A recess 9a is formed in the inner circumferential wall 7b' of the inner transmitting chamber 7' for supporting and retaining the inner dam 9 and has its one end extending to the outside thereof and resiliently abutting against the circumferential edge 2a of the inner rotor 2. A recess 11a is formed in the inner circumferential wall 8b' of the outer transmitting chamber 8' for supporting and retaining the outer dam 11 and has its one end extending to the outside thereof and resiliently abutting against the circumferential edge 3a of the outer rotor 3. The dams of the inner and outer chambers are made of resilient material so as to improve the functioning of the respective fluid feeders m and m'. However, the present invention need not always resort to such constructions but can be practised by means of the dams which are fixed to the partition, as is well known in the prior art.

Valves 13 and 14 are disposed together within the reservoir 6. Valve 13 comprises a valve body 13a, a springy valve arm 13b and a fixing portion 13c such that the valve arm 13b has at one end the valve body 13a and at its other end is fixed at 13c to the partition 4. It is also provided with an engagement hole 13' (see FIG. 4) through which it engages with a later-described pin. The other valve 14 similarly comprises a valve body 14a, springy valve arm 14b and a fixing portion 14c such that the valve arm 14b has at one end the valve body 14a and at its other end is fixed at 14c to the partition 4 and is formed with an engagement hole 14' (see FIG. 5) through which it engages with the pin. The valves 13 and 14 are so disposed that their respective arms 13b and 14b are spaced from each other while having their axes intersecting each other. Their respective valve bodies 13a and 14a are moved in sequence to and from the partition 4 thereby consecutively to close and open the inner and outer inlet ports 4a' and 4b' respectively. Valve arms 13b and 14b are spring biased so that they open and close the respective valves 13 and 14 in response to axial movements of the later-described pin.

In the embodiment shown in FIG. 2, valve 13 controls the inner inlet port 4a' whereas valve 14 controls the outer inlet port 4b'. In a later-described second embodiment shown in FIG. 6, valves 13 and 14 cover different ports from those of the first embodiment shown in FIG. 2, but the arrangements are arbitrary and are suitably determined in the practice of the present invention.

Referring to the first embodiment shown in FIG. 2, in addition to the engagement hole 14' for the pin, valve arm 14b is provided, as shown in FIG. 4, with a hole 14b' through which the other valve arm 13b is arranged to extend. This construction is presented merely by way of example, and the present invention can be practised using other arrangements. More specifically, although the two valves 13 and 14 in the embodiment of FIG. 2 are spaced in alignment from each other, they can be arranged to operate when intersecting the axis of the drive shaft 1 even in different diametrical positions.

A temperature-sensitive element 5 is disposed at the outside of the centre portion of the cover 5 and comprises a bimetal diaphragm 15 and a pin 16. The bimetal diaphragm 15 is supported by means of a bracket 15a. The pin 16 is composed of an outer end 16a and an inner end 16b and is inserted slidably in the axial direction in the centre portion of the cover s through a packing 16c so that its outer end 16a engages with the bimetal diaphragm 15 and its inner end 16b engages with the valve arms 13b and 14b thereby to transmit the warping deformation of the bimetal diaphragm 15 to the respective valve arms 13b and 14b.

In the embodiment shown in FIG. 2, the temperature-sensitive element s is constructed of the single bimetal diaphragm 15 and the single pin 16. As to the two valves 13 and 14, the valve arm 13b adjacent to the cover 5 is spring-biased to open the inner inlet port 4a' whereas the valve arm 14b adjacent to the partition 4 is spring-biased to open the outer inlet port 4b'. The pin 16 extends through the engagement holes 13' and 14' in the valve arms 13b and 14b respectively, and is formed with both a stopper t at the outside of the valve arm 13b adjacent to the cover 5 and a stopper t' at the inside of and at a distance d from the valve arm 14b adjacent to the partition 4. The lower operating temperature is determined by the bimetal diaphragm 15, and the higher operating temperature is determined by the distance d.

FIG. 2 shows the state at which the inner and outer inlet ports 4a' and 4b' are shut off. As the temperature-sensitive element s senses, when in driving operation, the determined lower temperature, the warping of the bimetalic diaphragm causes pin 16 to move sideways outwardly and the displacement of the outer stopper t allows the valve 13 to open the inner inlet port 4a' under its own spring bias. Fluid passing through port 4a' transmits torque to the inner transmitting chamber 7'. As the ambient temperature rises to the higher determined temperature the inner stopper t' moves over the aforementioned distance d and displaces valve 14 to open the outer inlet port 4b' against the spring force of valve arm 14b. Fluid passing through port 4b' thereby transmits torque to the outer transmitting chamber 8'.

The increase in the number of revolutions of the fan is illustrated in FIG. 8, in which an ordinate denotes the speed of the fan whereas the abscissa denotes the temperature sensed. In FIG. 8, moreover, flat lines a, c and e represent respectively the speed $v_1$ of the fan when the two inlet ports 4a' and 4b' are closed, the speed $v_2$ which is increased when the determined lower temperature T' is sensed, and the speed $v_3$ which is increased when the determined higher temperature T" is sensed. As the temperature falls, speed of the fan during the temperature drop returns to the line a from the line e through the line c. If the characteristic curve of FIG. 8 is compared with that of FIG. 9 (which is disclosed in the aforementioned Japanese Patent Publication No. 55-616), the respective slopes b and d in FIG. 8 are steeper with respect to the abscissa than the corresponding slopes in FIG. 9. Therefore, it will be understood from the characteristic curve in FIG. 8 that the fluid coupler according to the present invention is more effective in noise suppression and in power economy than that of the prior art. Incidentally, the reason why those effects can be attained by the fluid coupler of the present invention is partly because the valves for opening and closing the respective fluid inlet ports 4a' and 4b' are provided separately of each other and partly because the two valves are made movable at the respective predetermined temperatures relative to the partition for their opening and closing operations.

The stoppers t and t' are disposed outside of the valve arms when the spring bias of the valve arms act in the valve opening direction, and inside thereof when the spring bias of the valve arms act in the valve closing direction.

A second embodiment of the present invention will now be described with reference to FIG. 6. In the embodiment shown in FIG. 6, the temperature-sensitive element s is composed of outer and inner bimetal diaphragms 15' and 15" which are arranged at the outer and inner sides of the outer end wall of the cover 5, and the pin 16 is composed of inner and outer pins 16' and 16" which are slidably fitted one in the other (see FIG. 7). The outer pin 16" has its outer end 16"a engaging with the inner bimetal diaphragm 15" and its inner end 16"b abutting against the valve arm 13b adjacent to the cover 5. The inner pin 16' has its outer end 16'a engaging with the outer bimetal diaphragm 15' and its inner end 16'b abutting against the valve arm 14b adjacent to the partition 4. Both the respective valve arms 13b and 14b are spring-biased in the valve opening direction. Alternatively, the engagements between the respective inner ends 16'a and 16"a of the respective pins and the respective valve arms 13b and 14b may be effected in a similar manner to the first embodiment shown in FIG. 2. However, in FIG. 6, by way of example, the respective inner ends 16'a and 16"a of the outer and inner pins 16' and 16" are made to abut against the outer ends of the respective valve arms 13b and 14b thereby to exhibit the functions of the stoppers. In the embodiment shown in FIG. 6, the temperature at which the inner transmitting chamber 7' operates is determined by the outer bimetal diaphragm 15' whereas the temperature at which the outer transmitting chamber 8' operates is determined by the inner bimetal diaphragm 15". One of the operating temperatures is set at the lower temperature whereas the other is set at the higher temperature. The characteristic curve which is obtained on driving by the fluid coupler shown in FIG. 6 is similar to that of the fluid coupler shown in FIG. 2, as illustrated in FIG. 8.

I claim:

1. A temperature-sensitive fluid coupler comprising: a reservoir defined by one side of a partition and a cover; a first torque transmitting chamber defined by the other side of the partition and an inner casing; a second torque transmitting chamber defined by the inner casing and an outer casing; first and second rotors fixed to a drive shaft and rotatable within the first and second torque transmitting chambers, respectively; first and second fluid inlet ports formed in the partition for providing communication between the reservoir and the first torque transmitting chamber and between the reservoir and the second torque transmitting chamber, respectively; at least one temperature-sensitive element mounted on the outer side of the cover; a valve for each of the inlet ports; and means connecting the two valves to the temperature-sensitive element for consecutively opening and closing the valves in response to changes in temperature.

2. A fluid coupler according to claim 1 in which the means connecting the valves to the element comprises at least one pin means having its one end fixed to the temperature-sensitive element and reciprocally movable in the axial direction in response to changes in temperature, the two valves opening and closing the first- and second-fluid inlet ports, respectively, in accordance with the reciprocal movements of the pin means.

3. A fluid coupler according to claim 2, wherein the two valves are formed with holes, wherein the pin means includes a pin having a reduced portion extending through the holes wherein the temperature-sensitive element is fixed to one end of the pin, and wherein one of the two valves engages with the end portion of the reduced portion of the pin.

4. A fluid coupler according to claim 3 wherein the two valves each comprise a spring-biased valve arm each of which arms is formed with the hole through which the reduced portion of the pin extends, the arms being spaced apart along the axis of the pin, one arm located at or near each end of the reduced portion of the pin, each arm being movable in turn to open or close the respective valve on axial movement of the the pin by engagement of an end of the reduced portion of the pin with the adjacent arm against the bias of the spring.

5. A fluid coupler according to claim 2, wherein the pin means includes two pins slidably fitted one in the other such that one of them has its one end fixed to a first temperature-sensitive element and the other has its one end fixed to a second temperature-sensitive element and such that the other ends of the two pins contact with said two valves, respectively.

6. A fluid coupler according to claim 5 wherein the valves each comprise a spring-biased valve arm such that each arm is spring-biased into contact with the end of its respective pin.

7. A fluid coupler according to any one of claims 1 to 6 wherein the temperature-sensitive element is a bimetal diaphragm.

8. A fluid coupler according to any one of claims 1 to 6 further comprising a first fluid feeder for feeding a fluid under pressure formed at the circumferential edge of the first-named rotor.

9. A fluid coupler according to claim 8, wherein the first fluid feeder has a first dam extending into the first torque transmitting chamber, and a first fluid port for providing communication between the reservoir and the first torque transmitting chamber.

10. A fluid coupler according to claim 8, further comprising a second fluid feeder for feeding a fluid under pressure formed at the circumferential edge of the second rotor.

11. A fluid coupler according to claim 10, wherein the second fluid feeder has a second dam extending into the second torque transmitting chamber, and a second fluid port for providing communication between the reservoir and the second torque transmitting chamber.

* * * * *